United States Patent Office 2,960,821
Patented Nov. 22, 1960

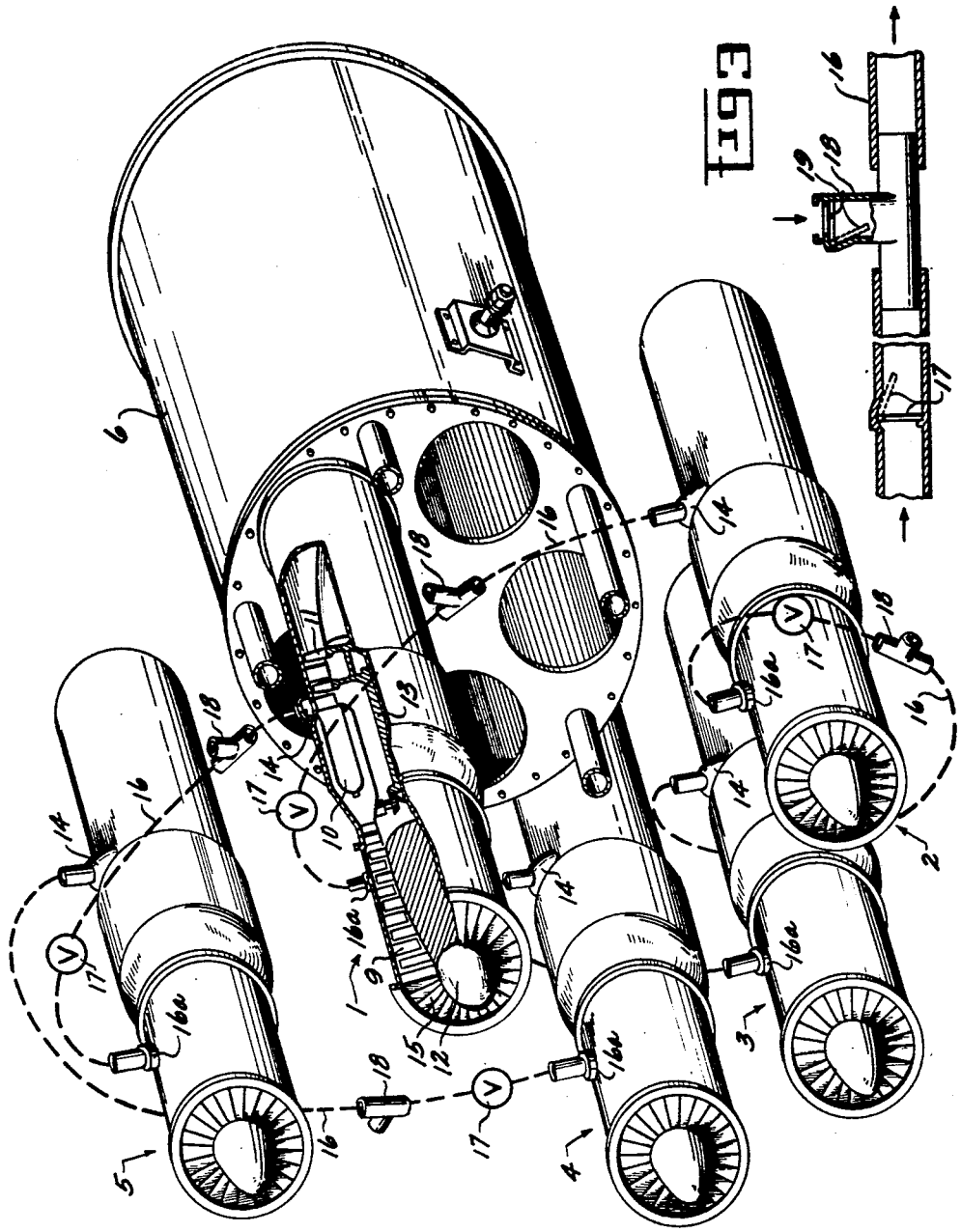

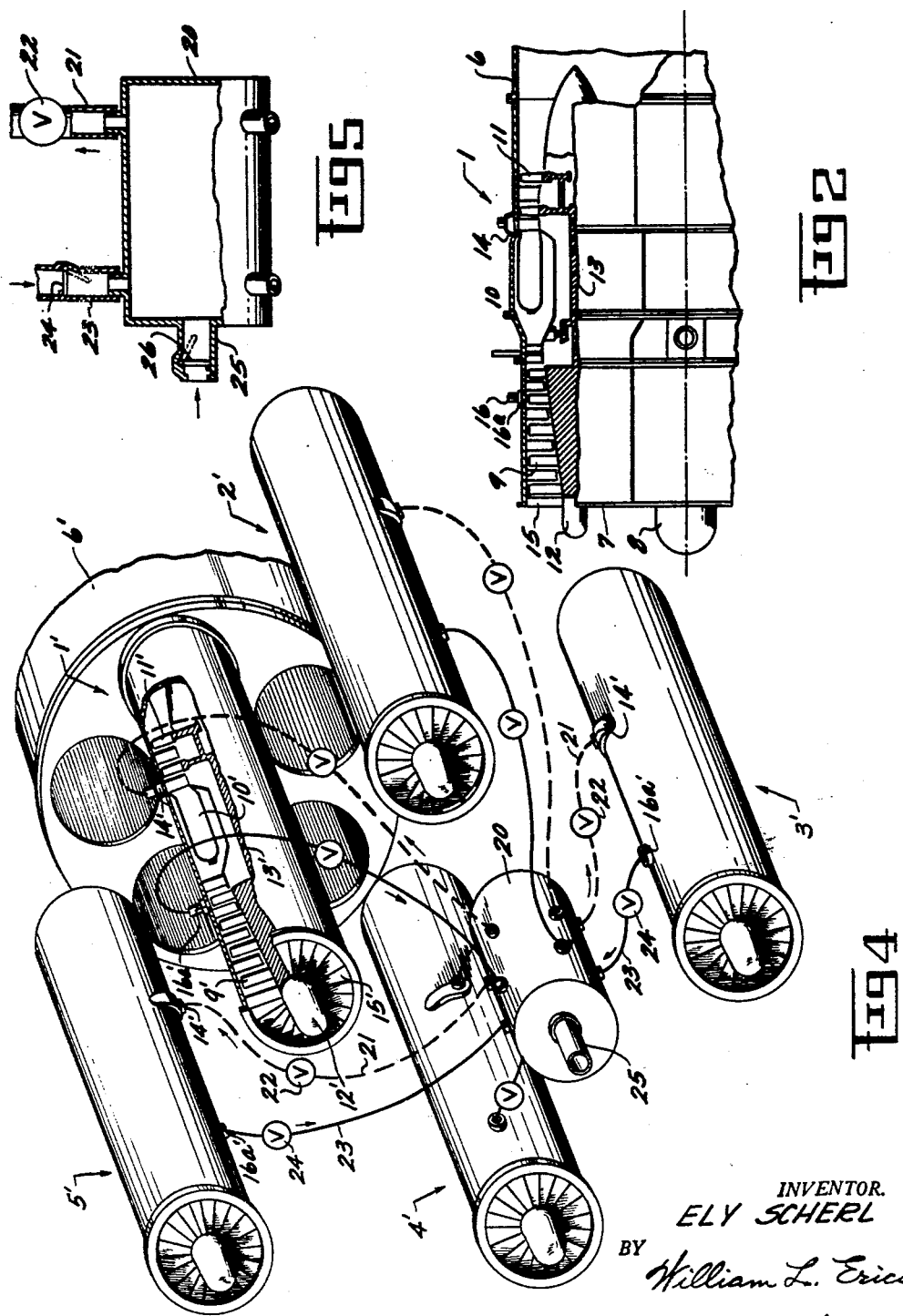

2,960,821

SYSTEM FOR PREVENTING RECIRCULATION IN CLUSTERED TURBINE ENGINES

Ely Scherl, Wakefield, Mass., assignor to General Electric Company, a corporation of New York Filed July 29, 1959, Ser. No. 830,298

5 Claims. (Cl. 60—35.6)

This invention relates to a system for preventing recirculation in clustered turbine engines having a common exhaust duct.

In recent years, the demand for high speed aircraft has been responsible for numerous advances in aircraft powerplant technology. In the course of research directed to aircraft powerplants capable of high speed performance, it has been found that a plurality of small engines arranged in a cluster will produce a thrust equal to that of a single larger engine while at the same time reducing the total weight of the overall engine for a given value of thrust. The appreciable saving in weight for a given value of thrust results in a more effective engine for high speed applications.

Although the use of a cluster of small engines in place of a single larger engine allows a substantial reduction in weight over the single larger engine for a desired value of thrust, the prior art does not disclose satisfactory arrangements for preventing recirculation of combustion products through non-operating (non-firing) engines. This problem arises in clusters of engines which exhaust into a common duct for developing a thrust reaction. The recirculation problem becomes most acute in systems having a free power turbine or a fuel combustion afterburner in the common exhaust duct, since the back pressure is increased thereby. Recirculation occurs during in-flight operation when a malfunction prevents operation of one or more engines, in such a cluster. In this situation, the pressure in the common exhaust duct exceeds the pressure at the aft end of each non-operating turbine. The pressure differential results in recirculation of hot combustion products through the non-operating engine to the common inlet. The elimination of undesired recirculation, while at the same time retaining the appreciable weight savings present in a clustered engine arrangement, presents a distinct problem for solution.

One form of solution to this problem in accordance with my invention contemplates the by-passing of a portion of the compressed motive fluid of one engine through suitable ducting to fluid impingement nozzle means for producing rotation of the turbine and compressor of a non-operating engine. This arrangement allows the non-operating engine to be turned over at a speed sufficient to insure that the pressure aft of the turbine will be high enough to prevent recirculation. While this arrangement results in some loss of efficiency in the operating engines, such loss is considerably less than would result from recirculation, and at the same time the system is simpler and lighter than one requiring installation of mechanical arrangements in each engine to prevent recirculation.

Accordingly, one object of my invention is to provide an improved system for clustered jet engines by which recirculation of hot combustion products from an operating engine through a common exhaust duct to a non-operating engine is prevented.

Further objects and advantages of my invention will become apparent as the following description proceeds.

Briefly stated, in accordance with one embodiment of my invention, I provide a plurality of small aircraft engines mounted in a common mounting structure. The exhaust gas from each of the small engines discharges into a common exhaust duct. Each of the plurality of small engines is provided with fluid impingement nozzle means adapted to cause rotor rotation at a sufficient speed to produce a turbine discharge pressure which will prevent recirculation. The fluid impingement nozzle means may comprise a conventional air impingement starter. By-pass duct means are provided interconnecting the compressor of one engine with the fluid impingement nozzle means of an adjacent engine, thereby allowing the bleed from the compressor of one engine to be used to turn over the rotor of another non-operating engine to prevent recirculation therein. Each engine in the system thus provides a source of compressed motive fluid for powering one of its adjacent engines, and at the same time each engine may be supplied with compressed motive fluid from an adjacent engine. Additionally, each duct is provided with control valve means to allow compressed fluid to be selectively by-passed, and with a T connector to allow for ground starting. A further embodiment of my invention contemplates the use of a common air supply manifold connected to each of the engine compressors and to each air impingement starter. This latter structure provides greater flexibility since the added load of a non-operating engine can be shared by all of the operating engines.

While the specification concludes with claims particularly pointing out and distinctly claiming the subject matter which I regard as my invention, it is believed that the invention will be better understood from the following description taken in conjunction with the accompanying drawings in which:

Fig. 1 is an exploded perspective view, partly in section, of a clustered engine structure embodying my invention.

Fig. 2 is a side elevation view, partly in section, of a portion of the clustered engine structure shown in Fig. 1.

Fig. 3 is a side view, partly in section, of a portion of the structure shown in Fig. 1.

Fig. 4 is an exploded perspective view, partly in section, of another form of my invention.

Fig. 5 is a side view, partly in section, of a portion of the structure shown in Fig. 4.

Referring to Figs. 1 and 2, a clustered jet engine arrangement, incorporating by-pass ducting means in accordance with my invention, has been illustrated. The cluster of small engines, in this embodiment, includes five engines shown generally at 1, 2, 3, 4, and 5. It will be apparent that although a cluster comprising five engines has been shown, more or fewer engines may be used if desired. The engines are mounted together in cluster form upstream of a common exhaust duct 6 by means of a mounting structure shown generally at 7. The mounting structure includes a centrally disposed tubular member 8 which may be used to house auxiliary components.

My present invention is an improvement over the application of Dennis T. Edkins, Raymond L. Cleveland, and Charles J. Wayne, Serial No. 789,556, filed January 28, 1959, and assigned to the assignee of the present application, which invention relates to "Engine Mounting Structures," and was made prior to my invention. I, therefore, do not herein claim anything shown or described in the Edkins et al. application, which is to be regarded as prior art with respect to the present application.

Referring to Figs. 1 and 2, it may be seen that only engine 1 has been shown in detail for the purposes of simplicity and clarity. It will be understood that the description of this engine is equally applicable to each of the other engines in the cluster. Each engine includes an axial flow compressor section 9, a combustion section 10, and a turbine section 11. A rotor 12 is employed for mounting the rotating elements. The turbine section 11 of each engine is drivingly connected to the compressor section 9 by means of shaft 13.

Fluid impingement nozzle means are provided for each engine of the cluster. In order to avoid duplication of parts, I prefer to utilize fluid impingement nozzle means 14 comprising conventional air impingement starter nozzles, which discharge fluid upon turbines 11 to produce rotation of rotors 12.

The hot exhaust products from the turbine section 11 of each engine are passed into the common exhaust duct 6, where they are commingled and where further combustion takes place. Duct 6 may discharge the exhaust products to atmosphere directly to develop a thrust reaction; however, it is desirable in some applications to provide fuel combustion afterburner means or a free power turbine in this duct.

Should any of the engines, as for example engine 1, be shut down, the pressure in duct 6 will exceed the pressure at the discharge end of turbine section 11. Such pressure differential will tend to recirculate hot products of combustion from duct 6 back through the non-operating engine to the common intake 15. This invention is concerned with preventing the aforesaid recirculation without the necessity of employing heavy mechanical closure members or other mechanical expedients, and their related operating components.

To this end I have provided by-pass ducts 16 for the purpose of interconnecting a bleed opening 16a in the compressor section 9 of one engine with the nozzle 14 of the adjacent engine. Conventional control valves 17, more clearly shown in Fig. 3, are provided in each duct 16 to allow selective by-passing of compressed motive fluid and to prevent reverse flow of hot combustion products therethrough. The particular type of control valve used and the control means for actuating it are not critical to my invention.

During in-flight operation, should any engine, as for example engine 1, be shut down, the valve 17 in by-pass duct 16 of engine 5 is opened by suitable control means. A portion of the compressed fluid from the compressor section 9 of engine 5 will then be bled through bleed opening 16a and duct 16 to nozzle 14 mounted on the turbine section 11 of engine 1, in the direction shown by the arrow. In this manner the compressor of engine 5 may be used to turn over the rotor 12 of engine 1, thereby insuring that the pressure aft of turbine section 11 of engine 1 is maintained at a sufficient level to prevent recirculation of the hot combustion products in exhaust duct 6 back through engine 1. Engines 1 and 2, 2 and 3, 3 and 4, and 4 and 5 respectively are connected by ducts 16 in a manner similar to that discussed for engines 5 and 1.

While I have shown ducts 16 passing from the compressor of one engine to the fluid impingement nozzle of the adjacent engine in clockwise direction, it will be appreciated that the ducting arrangements could pass in counterclockwise direction. Alternatively, the engines could be interconnected in pairs or in groups of more than two, and still fall within the true spirit and scope of this invention.

In order to provide for ground starting I have provided a T connector 18 in each duct 16 between control valve 17 and the fluid impingement nozzle 14. As may be more clearly seen in Fig. 3, each T connector 18 is provided with a check valve 19 to prevent the escape of compressed fluid from duct 16. In operation, a ground cart connection is attached to each T connector and compressed air is supplied through check valve 19 to each nozzle 14. Thus it may be seen, that all engine rotors 12 will be turned over although each engine may be brought up to speed individually. In this manner a positive pressure will be maintained at the discharge end of each engine turbine section 11 and recirculation of hot combustion products through the exhaust duct 6 to any non-operating engine will thereby be prevented.

In the embodiment shown in Figs. 4 and 5, the flexibility of the starting and operational system for clustered jet engines has been increased by providing a common air supply manifold 20 disposed in proximity to the plurality of engines. Engines 1', 2', 3', 4' and 5', and exhaust duct 6' are similar to those of the embodiment of Fig. 1, and are similarly numbered, with prime superscripts. Air is supplied directly from manifold 20 to the fluid impingement nozzle 14' via ducts 21, in the direction shown by the arrows. Each duct 21 is provided with a control valve 22 actuated by suitable control means and similar to control valves 17 in the embodiment disclosed in Fig. 1. Air is supplied to manifold 20 in the direction shown by the arrows, via by-pass ducts 23 which interconnect the manifold with one or more engine compressors for the purpose of providing a source of motive fluid for non-operating engines and thereby preventing recirculation of hot gases through the non-operating engines. It will be obvious that it is not necessary to interconnect all of the engine compressors with the manifold 20. Each duct 23 is provided with a conventional check valve 24 as is more clearly shown in Fig. 5. The manifold 20 is provided with a ground connection 25 having a check valve 26 therein. For starting purposes, it is merely necessary to attach ground connection 25 to a conventional ground cart whereby an external source of compressed air is supplied to each of the nozzles 14' via manifold 20 and ducts 21.

While the embodiment of my invention disclosed in Fig. 4 is somewhat heavier than the embodiment of Fig. 1, the system is more flexible during in-flight operation. In the embodiment of Fig. 4 any engine, or group of engines, can be used to impart power to any other engine. Consequently, the additional load imposed by a non-operating engine may be shared by two or more operating engines. Additionally, only one ground connection is required for starting purposes.

It will be apparent that I have provided a highly flexible system for the starting of and operation of a plurality of aircraft jet engines arranged in a cluster. The system provides a means for turning over non-operating engines by bleeding a portion of the compressed motive fluid from operating engines within the cluster, thereby insuring a positive pressure at the discharge end of each engine turbine. This pressure prevents the recirculation of hot exhaust gases through the common exhaust duct to the non-operating engines. The system is capable of operation both under starting conditions and under in-flight conditions should one or more of the engines be shut down due to a malfunction.

While I have shown and described particular embodiments of my invention it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In an engine arrangement having a plurality of turbine propulsion engines mounted in a cluster, each of said engines comprising a compressor, a combustion chamber and a turbine, and a common exhaust duct positioned downstream of said cluster; the combination of fluid impingement nozzle means for said turbine of each of said engines, and duct means for by-passing compressed motive fluid from the compressors of operating engines to said nozzle means of the remaining non-operating engines for rotating said compressors of said non-operating engines to prevent reverse flow of hot turbine exhaust gases from said common exhaust duct through said non-operating engines.

2. The combination of claim 1, together with a plurality of control valves each located in one of said duct means, said control valves allowing compressed motive fluid from said compressors of said operating engines to be selectively by-passed to said nozzle means of said other engines.

3. In combination, a plurality of turbine propulsion engines mounted in a cluster, each of said engines comprising a compressor, a combustion chamber, and a turbine, a common exhaust duct positioned downstream of said cluster and arranged to receive exhaust gases from each of said engines, fluid impingement nozzle means for said turbine of each of said engines, an air supply manifold, first duct means connecting said compressors of said engines to said manifold, and second duct means connecting said manifold to each of said nozzle means for conducting compressed fluid from said compressor to said nozzle means, and valve means in said second duct means actuable upon non-operation of any one of said engines to admit compressed fluid from said manifold to said nozzle means of said one engine.

4. The combination of claim 3, together with a check valve positioned in said first duct means for preventing reverse flow therethrough.

5. In combination, a plurality of turbine propulsion engines mounted in a cluster; each of said engines comprising a compressor, a combustion chamber, and a turbine drivingly connected with said compressor; a common exhaust duct postioned downstream of said cluster and arranged to receive exhaust gases from each of said engines, fluid impingement nozzle means for said turbine of each of said engines, duct means extending between said engines, and valve means actuable upon the non-operation of one said engines to supply compressed fluid through said duct means from another of said engines to said nozzle means of said one engine to rotate said compressor thereof to prevent recirculation of exhaust gases from said common exhaust duct through said one engine.

References Cited in the file of this patent
UNITED STATES PATENTS

| 2,806,351 | Kent et al. | Sept. 17, 1957 |

FOREIGN PATENTS

| 1,172,989 | France | Oct. 20, 1958 |
| 621,407 | Great Britain | Apr. 8, 1949 |
| 626,706 | Great Britain | July 20, 1949 |